(12) United States Patent
Chandley et al.

(10) Patent No.: US 7,389,432 B2
(45) Date of Patent: Jun. 17, 2008

(54) ADVANCED POWER MANAGEMENT FOR COMPUTER DISPLAYS

(75) Inventors: Adrian Chandley, Sammamish, WA (US); Christopher A. Schoppa, Redmond, WA (US); Clark D. Nicholson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 382 days.

(21) Appl. No.: 10/985,478

(22) Filed: Nov. 10, 2004

(65) Prior Publication Data

US 2006/0101293 A1    May 11, 2006

(51) Int. Cl.
　　G06F 1/26　　(2006.01)
　　G06F 1/32　　(2006.01)
　　G06F 3/038　　(2006.01)
　　G06G 5/00　　(2006.01)
(52) U.S. Cl. .................................. 713/320; 345/212
(58) Field of Classification Search ................ 345/212; 713/320
　　See application file for complete search history.

(56) References Cited

U.S. PATENT DOCUMENTS

| | | | | |
|---|---|---|---|---|
| 5,321,425 | A * | 6/1994 | Chia et al. | 345/569 |
| 5,598,565 | A * | 1/1997 | Reinhardt | 713/323 |
| 5,880,728 | A * | 3/1999 | Yamaashi et al. | 715/803 |
| 6,900,798 | B2 * | 5/2005 | Heie | 345/211 |
| 7,017,053 | B2 * | 3/2006 | Mizuyabu et al. | 713/300 |
| 2004/0233146 | A1 * | 11/2004 | Nguyen | 345/82 |
| 2004/0257316 | A1 * | 12/2004 | Nguyen | 345/87 |
| 2005/0052446 | A1 * | 3/2005 | Plut | 345/211 |
| 2005/0068311 | A1 * | 3/2005 | Fletcher et al. | 345/211 |
| 2006/0061563 | A1 * | 3/2006 | Fleck | 345/211 |

OTHER PUBLICATIONS

S. Iyer, L. Luo, R. Mayo, and P. Ranganathan, "Energy-Adaptive Display System Designs for Future Mobile Environments," Proceedings of MobiSys 2003: The First International Conference on Mobile Systems, Application, and Services, May 5-8, 2003, pp. 245-258.*

* cited by examiner

*Primary Examiner*—Thomas Lee
*Assistant Examiner*—Jaweed A Abbaszadeh
(74) *Attorney, Agent, or Firm*—Workman Nydegger

(57) ABSTRACT

Described is a method and system for power management of mobile computer displays, in which areas of the screen are selectively controlled to consume less power than other areas. For example, a foreground window having focus may receive normal brightness, while background areas are dimmed. To this end, the pixels of selected areas are controlled to vary color depth, resolution, refresh rate, brightness and/or the on/off state for any part of the display. Power settings for parts of the display not corresponding to a focused window can be gradually reduced over time. Power policy may determine which areas are given reduced power, and external mechanisms provide information useful in the determination, such as when the user last interacted with a window, where the mouse is hovering, explicit user instructions as to how to power manage a window, and sensors that detect where the user is likely to want more power.

31 Claims, 6 Drawing Sheets

ADVANCED POWER MANAGEMENT FOR COMPUTER DISPLAYS

FIELD OF THE INVENTION

The invention relates generally to computer systems, and more particularly to controlling displays on a mobile computer system to save power.

BACKGROUND OF THE INVENTION

One of the fastest growing markets in contemporary computing is in mobile computing devices, such as laptop computers. When selecting a mobile computing device, many consumers consider the weight and battery life to be very important criteria. To an extent, the weight and battery life are traded off; e.g., the larger the device, the larger the battery that is needed to power it, and more than one battery is often carried with the device to prolong its usability between recharges.

In general, when choosing a mobile device, the more efficient the power management, the longer the battery life will be relative to overall weight and/or system performance. As a result, device manufacturers are continually seeking ways to more efficiently manage power consumption.

The display on a mobile personal computer (PC) is one of the significant areas of power consumption, however the ability to control the power consumed by the display has heretofore been limited. Indeed, the power management methods that modern displays employ are essentially still rooted in technology related to the foundation of computer displays, the CRT. For example, for mobile PCs, users can set the backlight level, and set an inactivity timer to turn off the display when the system is not being used for a user-specified duration. This works because the backlight is a large power user. However, the user can only adjust the backlight level so much, based on the current surrounding environment, and the inactivity timer does not apply when the user is working on the computing device.

More recently, profiles have been added to allow the user to have different settings for various characteristics, including backlight settings and inactivity timer settings, for different modes of use, with a relatively easy way to switch between the predefined modes. For example, a user can set up and select one profile for a plugged-in state, another profile for normal use when on battery, another (maximum battery life) profile for times when battery life needs to be conserved, and so forth. However, even when running with a reduced power profile, when the device is in use the inactivity timer is irrelevant, and the user has to tolerate the lowered backlight level to conserve power, or if not able to because of the current environment, raise the backlight level but then lose the power savings.

What is needed is a way to provide improved battery life for mobile computing devices, including mobile PCs. In particular, the overall power consumption of device displays needs to be addressed in an advanced way.

SUMMARY OF THE INVENTION

Briefly, the present invention provides a system and method for managing the power of mobile displays by selectively controlling the power consumed by individual areas of the screen. For example, with the present invention, a program window in which a user is currently working (e.g., a focused window) may receive more display capability than other, background windows that are fully displayed or only partially displayed. Other areas of the display that may be visible, such as the background and any visible icons atop the background, are also selectively controlled to consume less power.

To this end, new display technologies comprising electroluminescent displays that use components such as organic light emitting diodes (OLEDs) or light-emitting polymers (LEPs, a type of plastic that can be charged to change color), are becoming available. With OLED or LEP technology, each pixel creates its own light/color, and therefore display power consumption is a direct function of the state of each of the pixels. For any given part of the display, the system and method may vary color depth, resolution, brightness and/or the on/off state. Display hardware can also be modified to be controllable as to different refresh rates in different areas, as controlled by the computer software. With standard LCD technology, the backlight can also be implemented using an array or other arrangement of small, low power light sources, such as LEDs, to provide a finer resolution for the backlight. It is also feasible to use an OLED panel as a backlight to a traditional LCD, although this may not have the same resolution as the display itself. In a similar manner to that described above for electroluminescent displays, the intensity of various areas of the backlight source array can be varied according to policy, user preferences and/or usage.

For example, the computer operating system has knowledge of user interaction with the display, such as which window currently has focus. The operating system also can be instructed by the user or another mechanism as to a desired display state, e.g., to display two windows at a relatively high-power consumption level, with any other windows and the background displayed with a relatively low-power consumption level. Other mechanisms that may control the power consumption of selected display areas include application programs that are aware of the ability to do so, and external sensors.

The operating system may control the power consumption on individual areas of the display screen in a number of ways. A first way is to adjust the color levels of the component colors (e.g., RGB), e.g., to lower the color levels for pixels that are deemed to not be in a high-power area such as a focused window, essentially darkening the display in the low-power areas. The adjustment may be gradual according to some linear or non-linear function, such as to reduce by some percentage multiplier per time unit, until some low threshold percentage is reached.

Other example ways to reduce power consumption in selected areas include changing the screen resolution, changing the color depth (number of bits per pixel) and changing the on/off state of the pixels. The refresh rate can also be changed in selected areas, either actually in the hardware, or effectively in the software, such as by changing the pixels to entirely black some percentage of the time so that those pixels will not be energized during the refresh. Note that the example ways to control display output provide power savings with any display technology, not only those in which pixels provide their own light when energized.

Other advantages will become apparent from the following detailed description when taken in conjunction with the drawings, in which:

DETAILED DESCRIPTION

Exemplary Operating Environment

Figure 1:
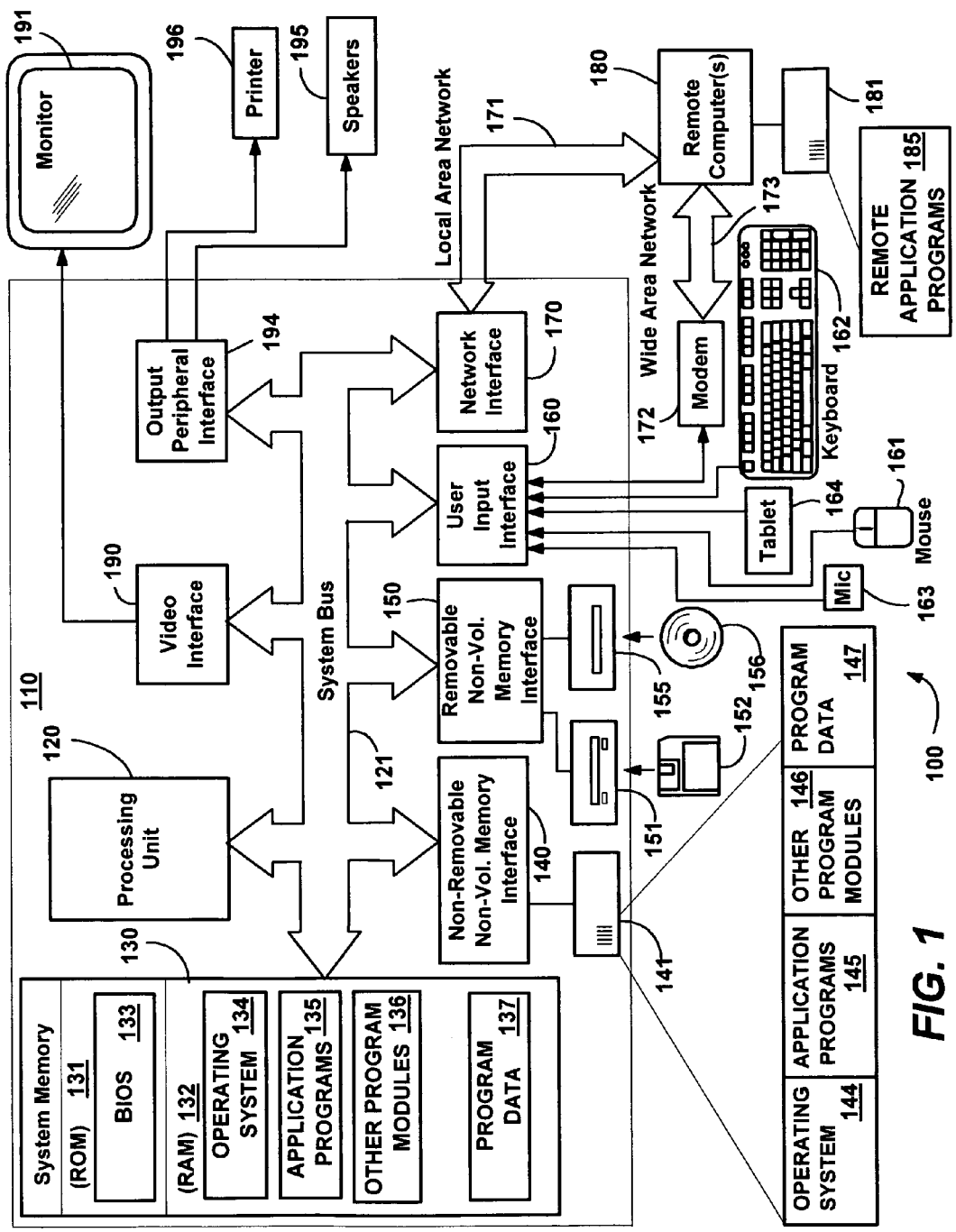
FIG. 1 is a block diagram representing a general purpose computing device in the form of a personal computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Note that as described below, the present invention is generally directed towards data sources, which may, for example, include data sources corresponding to a SQL server and/or XML data provider (web service), that reside on one or multiple remote systems. The computing environment 100 of FIG. 1 is understood to include any local and/or remote source of data, including the SQL server-provided data, web service server provided data, and others.

Advanced Power Management

The present invention is generally directed towards a system and method by which selected areas of a display screen are controlled so as to consume less power. As will be understood, numerous ways to implement the present invention are feasible, and only some of the alternatives are described herein. For example, the present invention is highly advantageous with displays in which each pixel creates its own light/color, thereby eliminating power-costly backlighting.

As will be understood, however, the selective power reduction aspects of the present invention will provide power savings with any type of display, including LCD, LED and CRTs, and even those not yet available, and as such, the present invention is not limited to any particular type of display. In fact, users with full-time plugged-in CRTs, or other displays may prefer reduced power to the background windows for purposes other than power savings, e.g., relative importance, better contrast, better concentration on one window, an improved ability to view notifications because of the better contrast, better conservation of electricity, and so forth.

As another example, the present invention may use lowered color levels to reduce brightness, different resolutions to reduce the number of pixels displaying information, different refresh rates, different color depths and/or other mechanisms to reduce power to selected screen areas. Some or all of these may be combined, and any may be done at once or gradually. As will be understood, some or all of the described power reduction mechanisms, as well as others, may be combined to conserve power. As such, the present invention is not limited to any particular examples used herein, but rather may be used various ways that provide benefits and advantages in computing in general.

Figure 2:
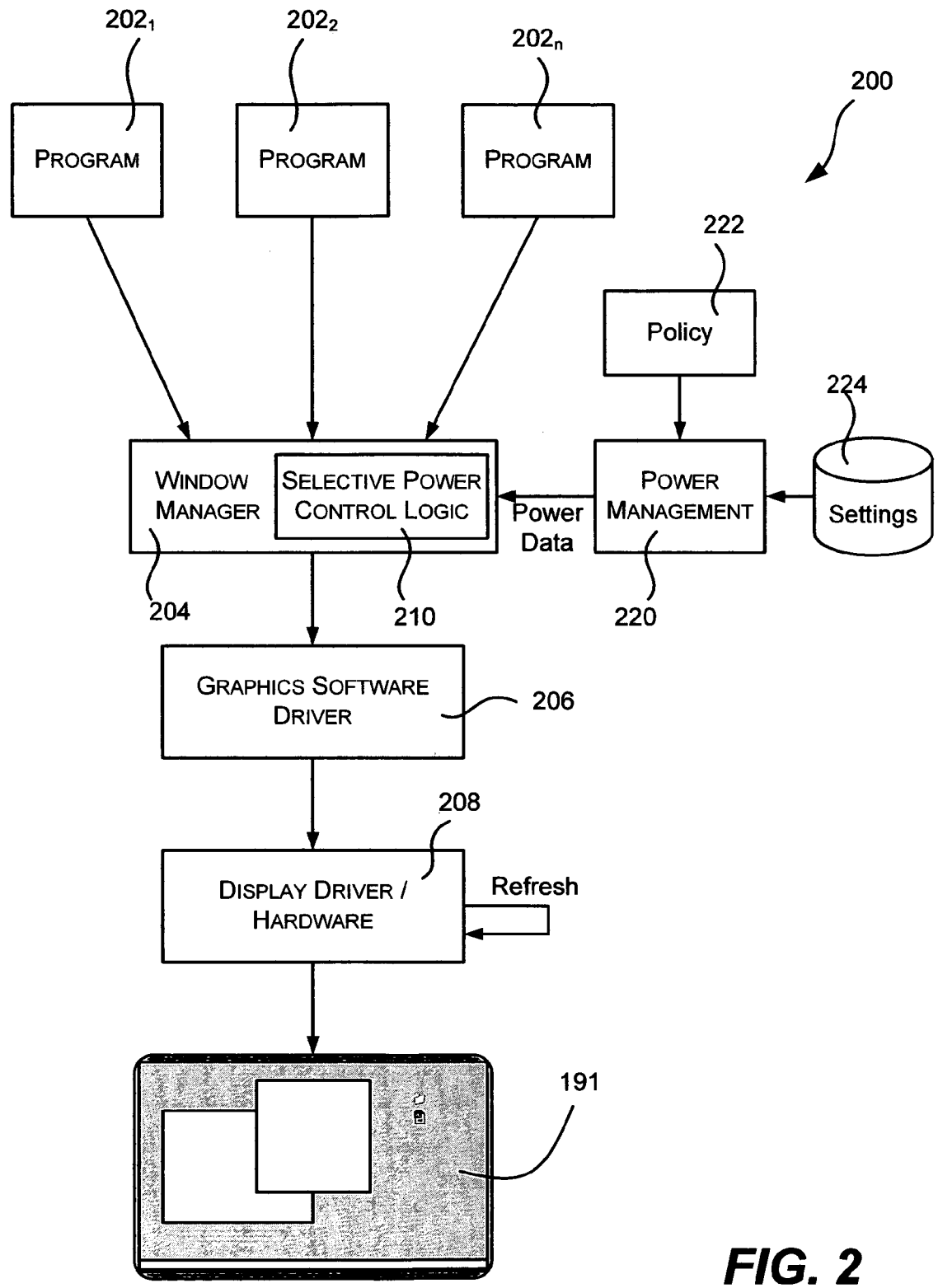
FIG. 2 is a block diagram generally representing programs and components below the programs for selectively controlling power to display screen areas, in accordance with various aspects of the present invention.

FIG. 2 shows an arrangement 200 containing example components into which the present invention may be implemented. In FIG. 2, various programs $202_1$-$202_n$ including application programs, user-mode programs such as the shell and other programs output data destined for the display. This may be done in any number of ways, including conventional paint calls to an API layer, or by providing rendering instructions and the like, possibly in a markup language such as extended application markup language, or XAML. Although not necessarily considered a conventional program, one or more of the programs of the set $202_1$-$202_n$ may be considered as providing other displayed information, such as a current background image, icons atop the background, the taskbar including the start icon, shortcuts, and/or the system tray, and essentially anything else that may be displayed. For purposes of simplicity herein, any other displayed information may also be considered as windows, e.g., the background and any icons atop it may be considered as a window that is always on bottom, while the taskbar may be considered as a special window that, when it appears, is always on top except for other windows specifically designated as being on top.

As represented in FIG. 2, a lower-level component in the operating system, such as a window manager 204, receives the program-provided display data and determines how the display data should be handled. One such consideration is which window or windows currently have focus. Another is whether items like the taskbar appear, and if so where, as well as whether other windows are present and whether any of those are designated always on top.

In general, the window manager 204 determines how the screen image should be laid out in terms of windows overlapping each other and their relative placement to one another, their sizes and the background/taskbar windows. This information is sent to a graphics software driver 206 and to the display driver/hardware (adapter) 208, where it is displayed on the display, such as the monitor 191 of FIG. 1. Note that a preferred display monitor 191 is one in which the power consumption is primarily a function of the pixels' individual brightness as perceived by a user. Thus, a backlit LCD or a CRT which consumes significant power regardless of how bright the screen appears is less desirable, because any savings achieved via the selective dimming mechanisms of the present invention are less noticeable in the overall power consumed. However, the present invention will still provide power savings in such environments, and thus still has value, particularly in systems designed with a backlight that comprises an array or other arrangement of individually controlled light sources, e.g., a transreflective or transmissive display. More power-saving benefits are realized with OLED or LEP technology in which each pixel creates its own light/color, and therefore display power consumption is a direct function of the state of each of the pixels. Note that as described below, pixels may comprise sub-pixel elements of component colors, e.g., each pixel (typically but not necessarily) is made of a red sub-pixel element, green sub-pixel element and blue sub-pixel element which can be individually controlled. For purposes of simplicity, the present invention will be described with reference to an RBG component color scheme, which may or may not have sub-pixel elements, although it is understood that other color schemes (e.g., CMYK) are equivalent.

The display driver/hardware 208 may comprise a conventional adapter that refreshes the screen with data from one or more frame buffers at a refresh rate that applies to the entire screen. As will be described below, however, some or all of the concepts of the present invention may be moved down to the display driver/hardware 208 level, and thus the adapter may be arranged to apply different resolutions, different refresh rates, different brightness levels and so forth to conserve power in keeping with the present invention.

In accordance with various aspects of the present invention, the window manager 204 obtains another set of information related to power data. As represented in FIG. 2, the window manager 204 includes selective power control logic 210 that determines how the power data should be used to control the display of program windows and other areas (windows) of the screen. In general, the power data is obtained from a power management mechanism 220 based on default and/or user-configurable policy 222 and settings 224. The power data may be requested as needed by the window manager 204, and/or may comprise one or more events fired by the power management mechanism 220. Essentially most if not all of the policy is user configurable, although there may be some estimating done for simplification purposes, e.g., the user may not be given the ability to reduce to exact percentage values.

Note that although in FIG. 2 the power control logic 210 is represented as being in the window manager 204, the actual level of the power control logic may be anywhere that suits a given environment. Indeed, the window manager 204 may alternatively call the power control logic, or another entity may do so. The window manager 204 is one reasonable alternative for containing the power control logic 210 because it already possesses information on window sizes, focus and the like. However, as is known, focus information may be obtained from the window manager 204 from components above or below it, and thus power reduction policy can be applied at different level. For example, an application program may determine its own level of brightness based on its current focused or non-focused state and the power state, and request that the window manager 204 respect its settings. In this way, application programs can voluntarily reduce their display power consumption at certain times, particularly when not in the foreground. The window manager 204 may still override the program's brightness requests based on policy, which the user can configure, such as based on the importance of the application program to that user, how much battery life actually remains, and so forth. For example, in a seriously low battery life situation, the display may be completely shut down to provide sufficient power to enter a hibernate state. Alternatively, the display light may be pulsed with a low duty cycle to reduce power but still allow the user the ability to save critical data. For purposes of simplicity herein, the present invention will be primarily described with reference to the window manager 204 containing or otherwise being associated with the selective power control logic 210 except where specifically noted otherwise.

In one embodiment, the selective power control logic 210 may apply a weighting scheme that determines how much weight to give to each window with respect to power consumption. Weighting factors may include whether the mouse is hovering over a window, the time since the window was last used (or last hovered over), whether the window itself does not have focus but belongs to an application that has another focused window, and so forth. Heuristics may be applied, such as to determine that the user is working in one window but keeps moving the mouse over another, e.g., to brighten that other window even though not selecting it for focus. One straightforward way to determine the user's intent with respect to a window is for the user to directly instruct the system, e.g., right-click on a window and give it normal power or reduced power until instructed otherwise, independent of the window's focus state. Indeed, virtually any mechanism that can sense a user's intent with respect to a window's brightness may be used, e.g., proximity sensors where a user can simply point to an area of the screen to brighten it, mechanisms based on eye movement sensors that brighten an area of the screen as the user looks at it and dims it as the user looks away, and so forth, are all feasible.

Figure 3:
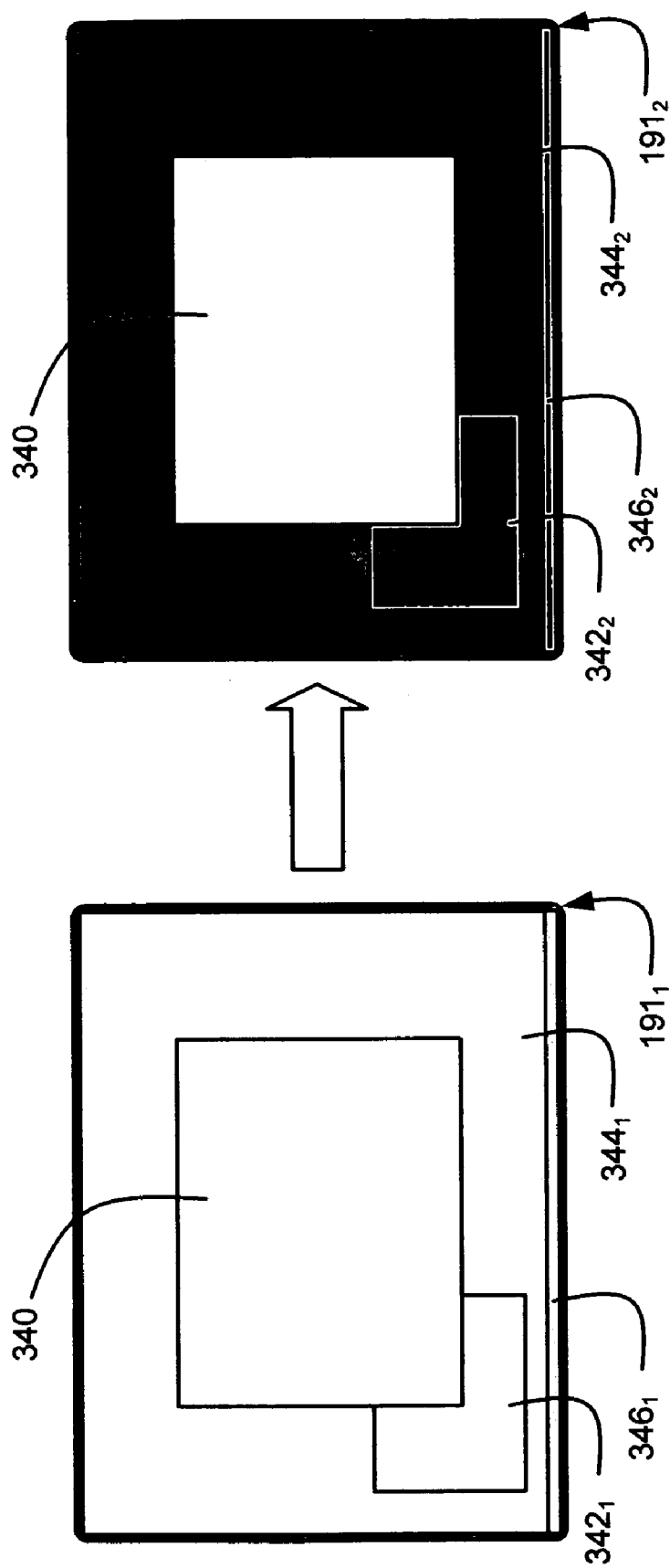
FIG. 3 is a representation of how power-related policy can change the output on the display screen in selected areas, in accordance with various aspects of the present invention.

Turning to an explanation of some of the example mechanisms for reducing power to selected screen areas, a first mechanism lowers the brightness values of the RGB component color values for areas of the screen that are selected for dimming. More particularly, once the window manager 204/selective power control logic 210 identifies an area for dimming, the component color values, ranging from 0 to 255 in conventional 24-bit true color schemes, are reduced in some way. FIG. 3 shows this generally, where a monitor operating in a first state 191$_1$ with respect to power consumption is automatically changed by policy (e.g., an event) to operate in a second monitor state 191$_2$ that consumes less power. However, the brightness of the foreground window 340 is not changed (at least not as much) as other screen areas such as the background window 342$_1$, background 344$_1$ and taskbar 346$_1$ change to respective low power states 342$_2$, 344$_2$ and 346$_2$.

Although virtually any algorithm may be used to reduce the values, a straightforward one is to simply multiply the values (e.g., corresponding to data provided by an application program) by a factor of less than one, such as ninety percent, e.g., a pixel having respective RGB values of 210, 191, 38 would be lowered to 198, 172 and 32 after multiplying and rounding. As can be appreciated, these new values may again be lowered, but multiplying them again some time later, thereby gradually darkening a screen area until it achieves some threshold percentage level. Alternatively, the original values may be preserved and used with a different reduction factor (e.g., 0.8) to accomplish the same purpose.

Note that the brightness change may be used in reverse, to increase the brightness. For example, it may be desired policy to temporarily brighten part of the display screen for notifications or the like. This may be accomplished by a multiplying factor greater than one, by restoring the original values prior to any dimming, or by requesting the program providing the notification to redraw the screen and not altering the pixel color levels. It may also be desirable to gradually brighten the screen, such as if a sensor determines that a user is looking at a reduced-power window on the screen, but that window does not have focus.

Another way to reduce power to a screen area is to lower its refresh rate relative to other areas. As described below, this may be done via specialized hardware, but is straightforward to implement in software, as long as the bandwidth to the display hardware is sufficient to push down possibly large numbers of pixel changes. For example, instead of illuminating a pixel with RGB levels of {25, 129, 242} once per refresh, occasionally a refresh may be skipped by sending an RGB level of {0, 0, 0}, to that pixel, that is, black/no power in typical schemes. Sending one set of zeroes every other time would result in a fifty percent effective rate; sending one set of zeroes every three refreshes would result in a two-thirds effective rate, and so on. Note that the zeroes need not be sent on the same frame, e.g., the same RGB values at a two-thirds refresh rate may be accomplished by sending {0, 129, 242} for the first frame, {25, 0, 242} for the second frame and {25, 129, 0} for the third frame. Different pixels may have the zero appear in a different order, e.g., middle, first, last, which may help avoid flickering. At reasonably fast frame rates, the eye will notice the darkening, but will likely not notice the color changes; the presence of sub-pixel elements may influence this behavior.

Note that this can also be applied to groups of pixels (and/or sub-pixel elements) rather than to individual pixels. For example, three of four pixels (such as in a row or in a two-by-two arrangement) may be energized per frame, with the other one set to black. The pixel that is turned off may rotate among the four, and the order may be random or planned (e.g., staggered) among the four to reduce the chance that it is noticed as flicker or the like, e.g., never two in a row. Sub-pixel elements can likewise be selectively energized within the set of pixels, e.g., given a set of four RGB pixels, with individual sub-pixel elements there are twelve elements that can be selectively energized to achieve a desired effect while reducing power.

Yet another way to reduce power is to change the effective resolution for a certain area. Because non-CRT displays such as OLED displays have a fixed number of discrete pixels, they are really only designed to display a single resolution, referred to as the screen's native resolution. However, interpolation may be used to scale display resolutions to fit a display's native resolution. Although such scaling typically reduces image clarity, this may be acceptable for background windows and the like where the user need not view the window in full resolution to recognize its general content.

As can be readily appreciated, one advantage of having a lower resolution is that there are less bits to deal with in performing the computations, and less data to update in the graphics hardware. Thus, lower resolution output may be used in conjunction with the reduced component color brightness and/or lowered effective frame rate mechanisms described above, where computational power and/or the pipeline to the graphics hardware is lowered. Note that computations and data communication also consume power, and thus the less computations that are performed, and the less data communicated to the graphics hardware, the more power is saved.

Figure 4:
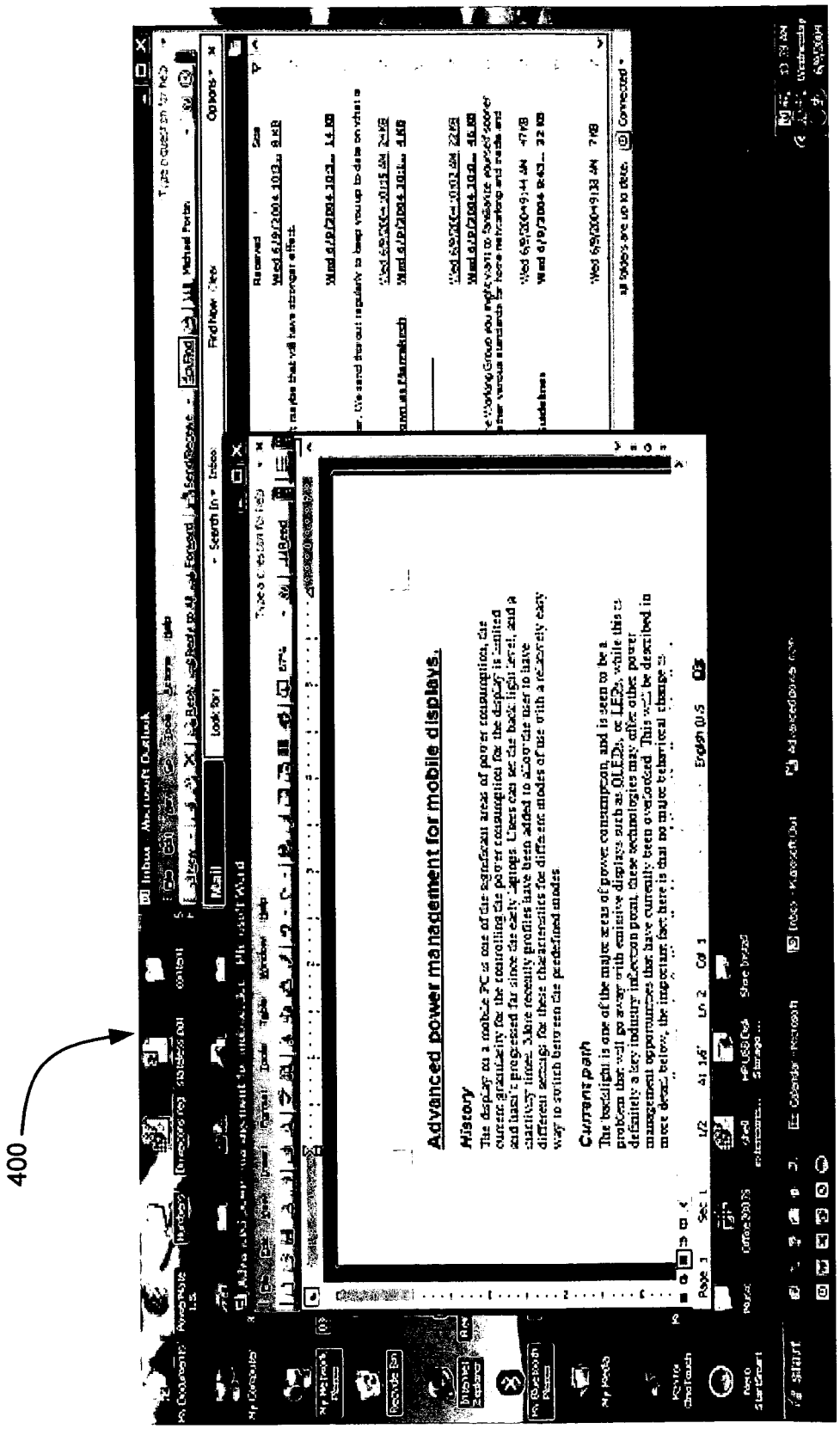
FIGS. 4-6 are representations of screen shots showing changes in color depth and resolution in background areas, in accordance with various aspects of the present invention power-related policy.
Figure 5:
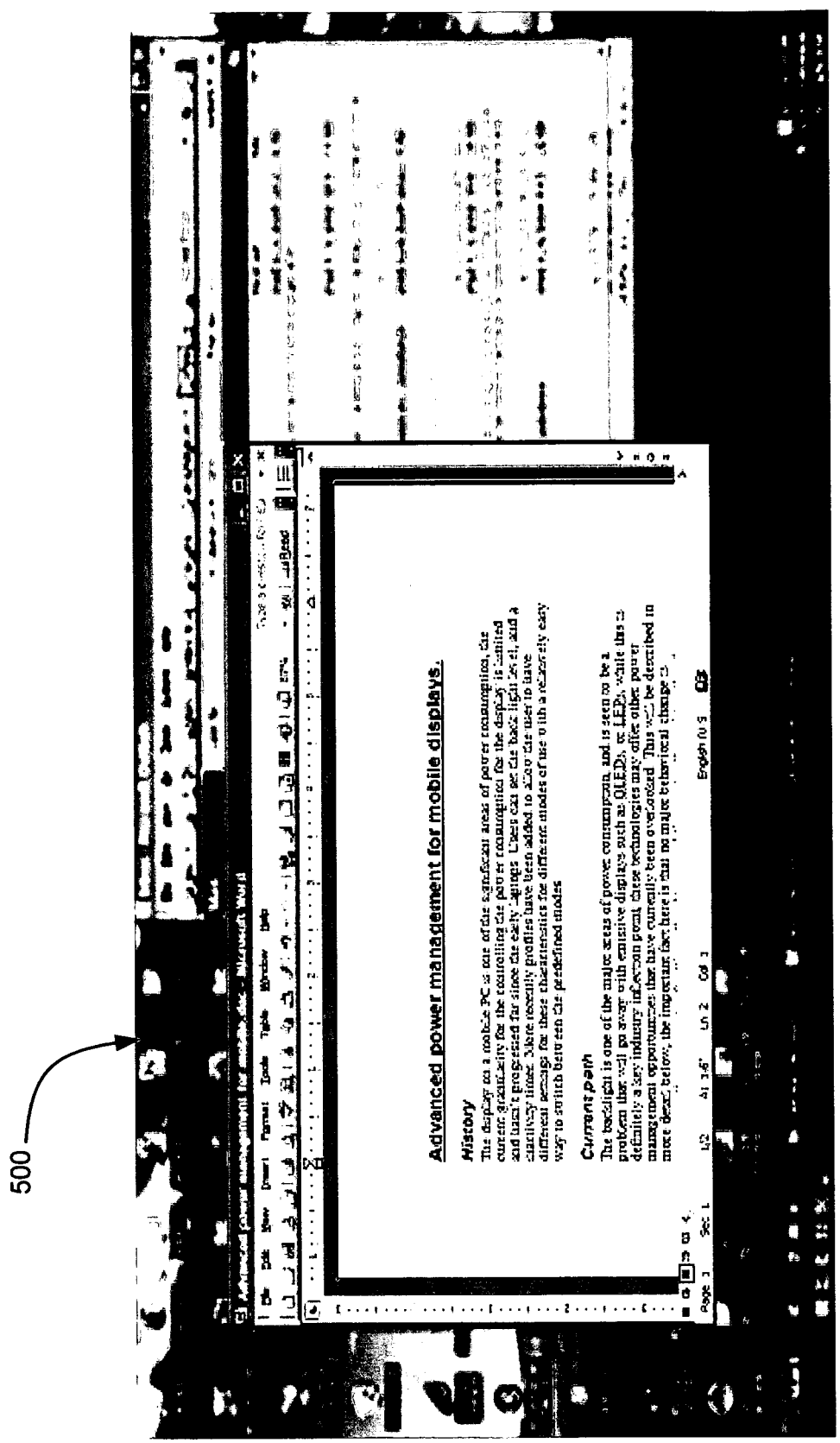

FIGS. 4 and 5 show how this appears, with FIG. 4 showing a pre-power reduced screenshot 400 and FIG. 5 showing the post-power reduced screenshot 500. In FIG. 5, the non-foreground areas have been reduced to one-quarter resolution relative to the original, a saving of forty-six percent of bits needing to be switched in this example (based on the window sizes).

In another alternative, the color depth can be varied, again using less computational power and requiring less data to be communicated. For example, instead of handling twenty four bits per pixel, only the first five bits may be considered. This reduces the number of visible colors, but also reduces power use, both in that the lower three bits are always zero and in that less power is used in computations and communications. For most users, reduced colors in background windows likely will be acceptable.

Figure 6:
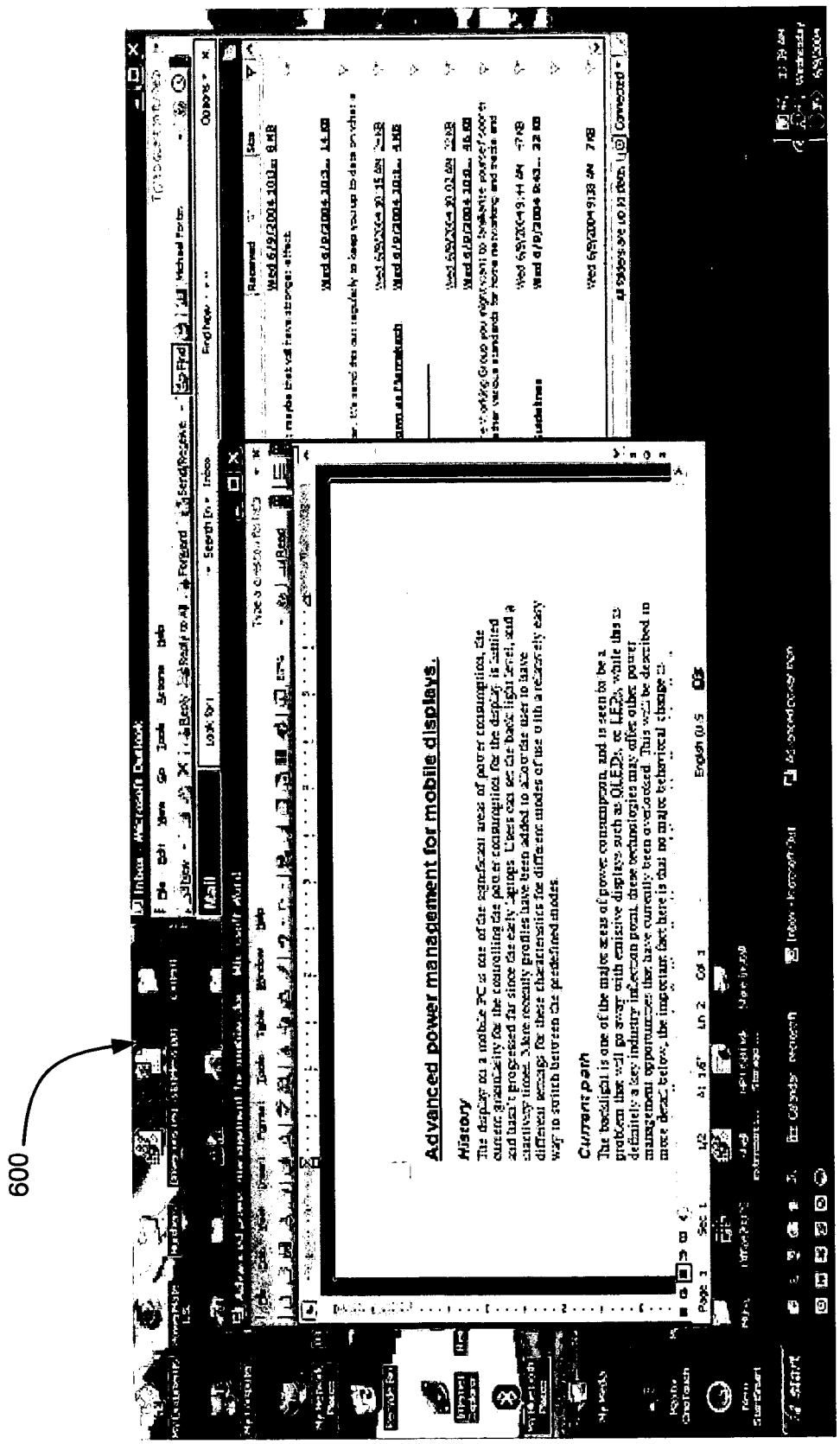

FIGS. 5 and 6 show how this appears (in grayscale), with FIG. 4 showing a pre-power reduced screenshot 400 and FIG. 6 showing the post-power reduced screenshot 600. In FIG. 6, except for the foreground application, the color depth of the screen has been dropped to 8-bit (from 24-bit), realizing a saving of forty-one percent in the count of bits needing to be updated in this example (based on the window sizes).

Combining the approaches of FIGS. 5 and 6 results in a saving of fifty-six percent, whereby more than half of the bits are no longer being updated. Turning the rest of the screen off, or progressively dimming the unused parts of the display will save a total of up to sixty-one percent of the screen power given the foreground window size.

Also, any pixilation and/or animation that may be occurring on one or more areas of the display may be changed and/or stopped. This will likewise result in less computations and data communication, and may further save power if, for example, the change results in the animated object being dimmed or otherwise caused to use less power via the various techniques described herein.

As can be readily appreciated, the use of an indexed color palette, while itself not new, can provide power savings if selectively used for background windows and the like. Consider a device set to operate in twenty-four bit true color. If instead one or more color palettes are used for selected areas of the screen, which also may be set up in advance to have corresponding values that are darker, very little computation needs to be performed to darken a screen area. There thus could be a ninety-percent palette, and eighty percent palette and so on that gets used as desired by the system to darken the screen.

Still another way to conserve power is to use an entirely different color scheme, including in the foreground window. As is readily apparent, bright white consumes more power than completely black, and thus one way to conserve power is to automatically switch the user into a white characters-on-black mode, instead of the contemporary black characters-on-white that most alphanumeric-centric programs, such as word processors and spreadsheets, use by default. Other color schemes (e.g., blue on yellow or vice-versa) may be employed instead. Both the foreground window or windows and background windows may save power by changing their color schemes.

Power may also be conserved by automatically changing the dimensions of the area or areas in focus, and possibly the other areas. In a typical situation, changing the dimensions would be to reduce the area of focus, whereby the remaining screen area increases relatively and may be subjected to one or more of the power reduction techniques described herein, e.g., the remaining screen area is darkened. Non-focused windows of the display may be minimized, typically leaving one focused window over the background. Depending on the background characteristics, (e.g., if the background is already dark), this may save power without any additional power reduction techniques, although additional power reduction techniques also may be applied.

Moreover, if background brightness is reduced, including via any mechanism or mechanisms described above, the contrast between the foreground and background will increase, whereby the foreground power also may be reduced (to some lesser extent) and still give the user a satisfactory computing experience. Note that although the amount that the foreground and background are dimmed may be the same, the rate of dimming the foreground and background may be the same or may be different. For example, the foreground may be dimmed at a slower rate relative to the rate at which background is dimmed, whereby a typical user may not even notice the reduction in foreground brightness.

Other ways to reduce power include turning areas of the display translucent, and/or turning areas of the display opaque. The DPI may be scaled, as this affects the power necessary to change the amount of pixels used relative to the native resolution of the display (which is different than changing the resolution).

It should be noted that any or all of the foregoing ways to reduce power may be combined. For example, it is straightforward to reduce the color level values as well as change the effective resolution, change the actual or effective refresh rate, and so on. A combination of effects based on the current level of ambient lighting, policy, settings and/or instructions may be implemented. Essentially, any way to reduce overall power is feasible, as long as it leaves the user with a satisfactory computing experience. For example, it is highly likely that some users will prefer having the foreground window illuminated and the rest of the screen completely black, while other users will prefer some level of background visibility. The present invention allows users to configure a system to their own particular preferences.

Moreover, the above mechanisms may be combined with respect to the same pixel or grouping of pixels, but need not be. Instead, one or more of the mechanisms may be applied to different areas of the screen, e.g., one area may be given a lower refresh rate, another lower component color intensity values, another reduced resolution, and so forth. For example, the background may be given low resolution, but the taskbar normal resolution with reduced brightness.

Although the present invention was described above with reference to operating system software controlling the power per screen area, it can be readily appreciated, that some or all of the power control mechanisms may be moved to the display driver/hardware level 208. As is known, processing at the graphics level has become common, and many contemporary display adapters provide a relatively powerful graphics processor. Thus, with an appropriate display adapter, rather than control pixels via logic at the operating system level, the operating system can instead provide general control information to the display adapter for controlling the pixels. This may be done by specifying areas such as via the coordinates of a rectangle (or multiple rectangles) or possibly other shapes, along with a corresponding power level for each area (which may be high or low, or some more granular value such as 0 to 255). With this information, the low level driver/hardware may use different refresh rates per pixel, such as in hardware itself or by periodically building some frames with more black pixels in a reduced power area. The low level driver/hardware may also likewise apply a reduction multiplier to the pixel brightness levels. Indeed, as long as instructed as to what screen areas have reduced power, and possibly a level to reduce for each, essentially any of the above-described mechanisms may be performed at a lower level. Note that this also may save bandwidth relative to mechanisms in which the operating system regularly makes changes to the pixels to reduce power, which is particularly valuable with low-bandwidth (e.g., wireless) scenarios.

As can be seen from the foregoing detailed description, there is provided a system and mechanism that significantly reduce the amount of power consumed by a computing device's display, resulting in improved battery life for mobile computing devices. The present invention thus provides numerous benefits and advantages needed in contemporary computing.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system having a display, a method comprising:
   determining a first area on the display; determining a second area on the display;
   determining how power data should be used to control areas on the display based on user-configurable settings;
   determining how much weight to give each window within the display by applying a weighing scheme; and
   using the weighing scheme to reduce power consumed by the second area relative to power consumed by the first area by modifying a refresh rate of the second area such that the first area and the second area have different refresh rates and wherein modifying the refresh rate of the second area includes alternately skipping and providing illumination of at least one color within a pixel in the second area during refresh cycles of the second area.

2. The method of claim 1 wherein reducing power consumed by the second area relative to power consumed by the first area by modifying the refresh rate of the second area comprises gradually changing power consumption over time.

3. The method of claim 1 wherein reducing power consumed by the second area relative to power consumed by the first area comprises using an indexed color palette wherein the first area and second area on the display are displayed using a different percentage of the indexed color palette.

4. The method of claim 1 wherein reducing power consumed by the second area relative to power consumed by the first area comprises modifying a resolution.

5. The method of claim 1 wherein reducing power consumed by the second area relative to power consumed by the first area by modifying the refresh rate of the second area comprises lowering power to at least some pixels in the second area.

6. The method of claim 1 wherein reducing power consumed by the second area relative to power consumed by the first area by modifying the refresh rate of the second area comprises lowering power to at least some sub-pixel elements in the second area.

7. The method of claim 1 further comprising, receiving an event based on a power-related policy, and wherein reducing power is performed in response to the event.

8. The method of claim 1 further comprising, changing power to provide a notification.

9. The method of claim 1 wherein reducing the power consumed by the second area relative to the power consumed by the first area by modifying the refresh rate of the second area comprises lowering the power consumed by both the first and second areas, while lowering the power consumed by the second area more than the power consumed by the first area.

10. The method of claim 1 wherein determining the first area on the display comprises determining a window that has focus.

11. The method of claim 1 wherein determining the first area on the display comprises receiving a user instruction with respect to at least one area.

12. The method of claim 1 wherein determining the first area on the display comprises sensing user intent with respect to at least one area.

13. The method of claim 1 wherein the display comprises a backlight having at least some individually controlled light sources, and wherein reducing the power comprises controlling at least some of the light sources corresponding to the second area differently relative at least some of the light sources corresponding to the first area.

14. The method of claim 1 wherein reducing the power comprises performing at least one step of a set of steps, the set containing: turning an area of the display translucent; turning an area of the display opaque; performing a scaling operation; changing dimensions of a focused area and a non-focused area; changing pixilation; stopping pixilation; changing animation; stopping animation; and minimizing at least one non-focused area of the display.

15. The method of claim 1 wherein reducing the power includes obtaining information corresponding to at least one criterion of a set of criteria, the set containing: ambient lighting data; other policy data; settings data; and instruction data.

16. At least one computer-readable storage media storing computer-executable instructions, which when executed perform the method of claim 1.

17. The method of claim 1 wherein the method includes modifying the refresh rate of the second area relative to a refresh rate of the first area and by sending at least one zero value for a color to at least one pixel, wherein the zero value causes the at least one pixel to alternately avoid illumination of said color during the refresh cycles.

18. The method of claim 17, wherein modifying the refresh rate of the second area relative to the refresh rate of the first area comprises sending a zero for one color of the pixel while maintaining original color values for at least one other color of the pixel during at least one refresh cycle and such that the pixel is only partially illuminated during the refresh cycle, and such that at least a portion of the pixel is illuminated while illumination of a portion of the pixel is skipped.

19. In a computer system having a display, a system comprising:
a provider of power-related policy; and
a display management mechanism coupled to the provider, the display management mechanism associated with a window manager that manages each window on the display, the display management mechanism configured to control a refresh rate of at least one window relative to a refresh rate of at least one other area of the display upon receiving policy data from the provider such that power consumption of the display changes based on the power-related policy, the display management mechanism determining how power data should be used to control areas on the display based on user-configurable settings and determining how much weight to give each window within the display by applying a weighing scheme; and
wherein the display management mechanism uses the weighing scheme to modify the refresh rate of the second area on the display by alternately skipping and providing illumination of at least one color within a pixel in the second area during refresh cycles of the second area.

20. The system of claim 19 wherein the policy data corresponds to an event fired by the provider.

21. The system of claim 19 wherein the display manager controls the relative appearance by modifying all of the following: a resolution; a refresh rate; pixel power; sub-pixel element power; a color scheme; and a color depth.

22. The system of claim 19 wherein the display management mechanism controls the relative appearance to reduce power to at least one area of the display that does not correspond to a window that has focus.

23. The system of claim 19 wherein the display manager controls the relative appearance by performing all of the following: turning an area of the display translucent; turning an area of the display opaque; performing a scaling operation; changing dimensions of a focused area and a non-focused area; changing pixilation; stopping pixilation; changing animation; stopping animation; and minimizing at least one non-focused area of the display.

24. In a computer system having a display, a method comprising:
determining whether a window within the display has focus;
obtaining policy information related to displaying a window that is not in focus;
determining how power data should be used to control areas on the display based on user-configurable settings;
determining how much weight to give each window within the display by applying a weighing scheme; and
using the weighing scheme to modify a refresh rate of the window that is determined to not have focus and in response to determining that the window does not have focus, wherein the refresh rate of the window that does not have focus is modified by at least alternately skipping and providing illumination of at least one color within a pixel in the window that does not have focus during refresh cycles of the window that does not have focus.

25. The method of claim 24 wherein a program having the window obtains the policy information and reduces the power.

26. The method of claim 24 wherein an operating system component obtains the policy information and reduces the power.

27. The method of claim 24 wherein obtaining the policy information comprises receiving an event.

28. The method of claim 24 wherein reducing the power comprises gradually changing power consumption over time.

29. The method of claim 24 further comprising, reducing power consumed by at least one other area of the display.

30. The method of claim 24 wherein modifying the refresh rate includes obtaining information corresponding to at least one criterion of a set of criteria, the set containing: ambient lighting data; other policy data; settings data; and instruction data.

31. At least one computer-readable storage media storing computer-executable instructions, which when executed perform the method of claim 24.

* * * * *

UNITED STATES PATENT AND TRADEMARK OFFICE
CERTIFICATE OF CORRECTION

| | | |
|---|---|---|
| PATENT NO. | : 7,389,432 B2 | Page 1 of 1 |
| APPLICATION NO. | : 10/985478 | |
| DATED | : June 17, 2008 | |
| INVENTOR(S) | : Adrian Chandley et al. | |

It is certified that error appears in the above-identified patent and that said Letters Patent is hereby corrected as shown below:

In column 12, line 19, delete "scenanos." and insert -- scenarios. --, therefor.

Signed and Sealed this
Twelfth Day of April, 2011

David J. Kappos
*Director of the United States Patent and Trademark Office*